| 1 | 2 | 3 | 4 | 5 | 6 | 7 |
|---|---|---|---|---|---|---|
| Planet | $\varepsilon$ | $k$ | $a$ | $\beta$ | $\dfrac{A}{R}$ | $\dfrac{B}{R}$ |
| Merkur | 0,2056 | 0,20775 | 0,021299 | 0,02155 | 1,021299 | 0,97845 |
| Mars | 0,09334 | 0,09354 | 0,004364 | 0,00437 | 1,004364 | 0,99563 |

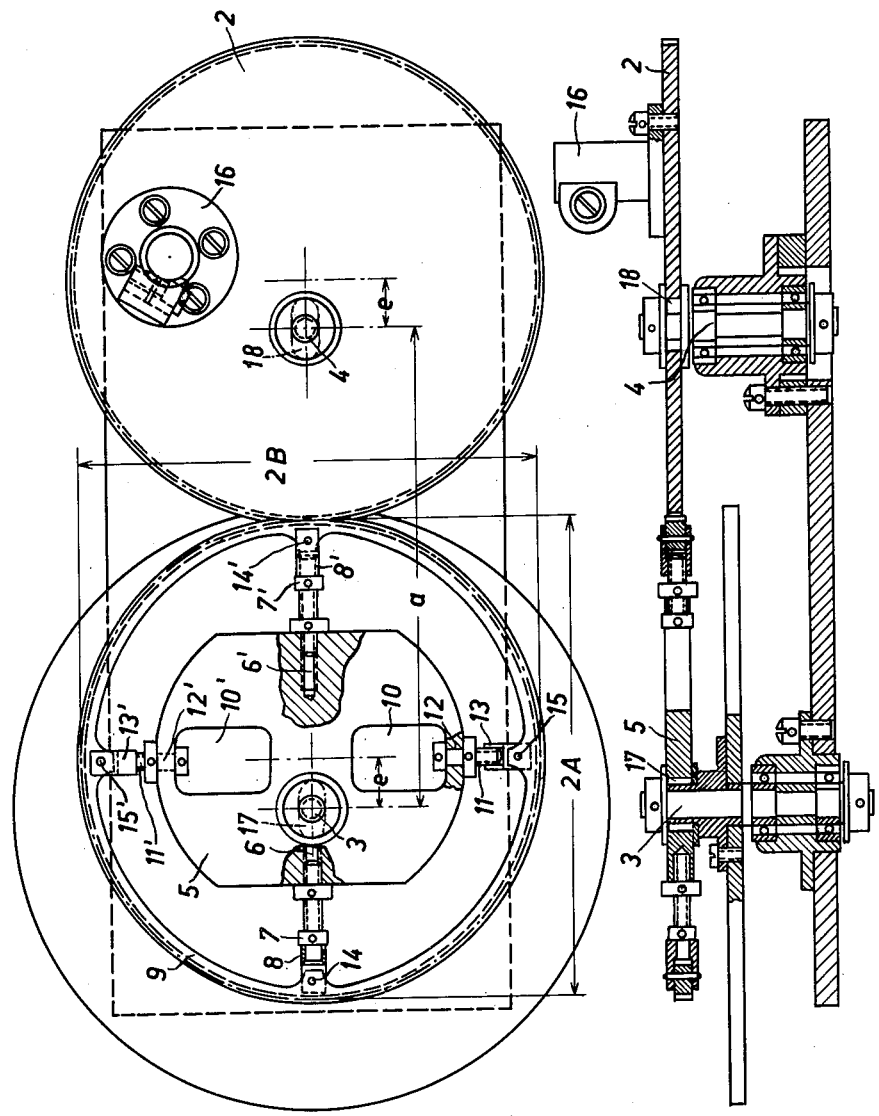

United States Patent Office 3,125,892
Patented Mar. 24, 1964

---

3,125,892
GEAR MECHANISM FOR REPRESENTING PLANETARY MOTION IN A PLANETARIUM APPARATUS
Gerhard Schwesinger, Heidenheim (Brenz), Wurttemberg, Germany, assignor to Carl Zeiss, Heidenheim (Brenz), Wurttemberg, Germany
Filed Jan. 8, 1962, Ser. No. 164,913
Claims priority, application Germany Jan. 7, 1961
9 Claims. (Cl. 74—393)

This invention relates to a gear mechanism comprising a pair of gear wheels in rolling engagement with each other and in which the gear wheels are non-circular with respect to their pivotal axis of rotation, the distance between the axes of the gear wheels being fixed and designated with $a$. The gear mechanism serves as a portion of a projection planetarium or of a sun system projector or the like which produces the variable angular velocity with which a planet revolves about the sun or with which a satellite revolves about the central body.

The angular velocity of the elliptic orbit of a planet or satellite follows the second one of Keppler's laws. The variable angular velocity according to this law has to be derived, in a planetarium device, from a uniform angular velocity of the drive mechanism. Accordingly, the problem is to produce from a shaft which revolves with a constant mean velocity of the planet to be represented and whose angle of rotation is designated with $\psi$ another rotary motion the angle of rotation of which is designated with $\varphi$, and which latter velocity is periodically variable according to the second one of Keppler's laws so that upon completion of a full revolution of the $\Psi$ shaft, the $\varphi$ shaft also has made a full revolution.

The difference of the angles of rotation $\varphi - \psi$ may be considered as a periodic function of $\psi$ and may therefore be represented by a Fourier's series. When the angle of rotation is computed starting from the perihelial position, the corresponding Fourier's series will contain only sine expressions and therefore will be comparatively simple.

Various gear mechanisms are known which fairly well approximate the theoretical requirements. Most frequently, a crank slot gearing is used, particularly in cases in which planetary motions having very small orbit eccentricities are used, whereby the crank radius is substantially greater than the distance between the pivot pin of the crank and the pivot point of the crank slot. The approximation obtained by such a gearing is, however, no longer sufficient if the eccentricity of the orbit reaches a magnitude of about 0.1 or more. In such cases, two crank slot gearings having suitable perimeters have been arranged in sequence one behind the other.

The aforementioned gear mechanisms produce a very satisfactory approximation, for the residual errors amount to only a fraction of the third power of the eccentricity. In FIG. 1 the characteristic I indicates the residual errors for the orbit of the planet Mercury which has an eccentricity of $\epsilon=0.2056$.

The double crank slot gearing is, however, rather complicated and includes a plurality of movable elements, among them two sliding elements which are particularly subject to wear. After an extended period of operation, such gear mechanisms tend to produce irregularities of motion due to appreciable wear.

Another known gear mechanism for producing the periodically variable orbit velocity comprises two identical elliptical gear wheels rolling on each other. The eccentricity of the rolling ellipse is equal to the eccentricity of the planet orbit to be represented. (See Charles F. Hagar, "An Elliptical Gear Mechanism for Use in Projection Orreries and Planetariums," California Academy of Science, San Francisco, 1960.) The residual errors in the orbit of the planet are substantially greater in this gear mechanism than in a mechanism using a combined crank slot gearing. These residual errors are plotted in FIG. 1 in characteristic II for the orbit of the planet Mercury and attain magnitudes up to about 0.7° which is unsatisfactory in planetariums.

The gear mechanism according to the instant invention permits a very exact representation of the planetary motion with the aid of two gear wheels which are non-circular with respect to their pivotal axes and which roll upon one another, having a fixed axial distance $a$, the driven gear being an eccentrically journaled circular gear wheel.

The specific advantage of the gear mechanism according to the invention resides in that it permits a particularly exact representation of the orbit of a planet with elements of simple construction, thus avoiding the aforementioned disadvantages still encountered in the hitherto known crank slot gearings.

Furthermore, the gear mechanism according to the invention produces a greater accuracy in the representation of the orbit than it is possible in known gear mechanisms.

In the following description reference is had to the subsequently quoted terms and abbreviations:

$a$=the distance between the two gear wheels
$R$=the radius of the pitch circle of the driven gear wheel which is disposed eccentrically with respect to the pivotal axis
$e$=the distance of the center of the pitch circle of the driven circular gear from its axis of rotation $$K=\frac{e}{R} \qquad (1)$$

$$\alpha=\frac{a}{R}-2 \qquad (2)$$

In a gear mechanism according to the invention the value K to be obtained is determined solely by the eccentricity of $\epsilon$ of the orbit to be represented and may be computed from the following equation of the 6th degree:

$$K^6+160K^4-208\epsilon K^3+64K^2+64K\epsilon-128\epsilon^2=0 \qquad (3)$$

The development of this last named Equation 3 is as follows:

If one considers FIG. 2 and starts with the driven circular gear 2 whose polar angle is $\varphi$ and whose radial vector is $r_2$, then the following condition exists according to the theory of non-circular gears, as disclosed for example by J. J. Pesqueira in "Principles of Design for Non-Circular Gears," published in Product Engineering, December 1936, page 455, equation (10), for the polar angle $\psi$ of the driving gear 1:

$$\psi = \int_0^\varphi \frac{f(\varphi)}{a-f(\varphi)} d\varphi \qquad (I)$$

in which $f(\varphi)$ indicates the relation between the radial vector $r_2$ and the polar angle $\varphi$ of the gear 2, namely $$r_2 = f(\varphi) \qquad (II)$$

For the triangle in FIG. 2 whose corners are formed by the point $P_2$, the axis of rotation of the gear 2 and the center of the pitch circle, is according to the well known equation of trigonometry $$r_2^2 + 2er_2 \cos \varphi + e^2 = R^2 \qquad (IIa)$$

from which is obtained $$r_2 = -e \cos \varphi + \sqrt{R^2 - e^2 \sin^2 \varphi} = f(\varphi) \qquad (III)$$

This value is now inserted in Equation I after the latter was revised somewhat and the result is $$\psi = \int_0^\varphi \left[-1 + \frac{a}{a-f(\varphi)}\right] d\varphi = -\varphi + a \int_0^\varphi \frac{d\varphi}{a-f(\varphi)}$$
$$= -\varphi + a \int_0^\varphi \frac{d\varphi}{a + e \cos \varphi - \sqrt{R^2 - e^2 \sin^2 \varphi}}$$

By employing the abbreviations K and $\alpha$ as defined by the Equations 1 and 2 one obtains, when the numerator and the denominator of the integrand are reduced by R:

$$\psi = -\varphi + (2+\alpha) \int_0^\varphi \frac{d\varphi}{2+\alpha + K \cos \varphi - \sqrt{1-K^2 \sin^2 \varphi}} \qquad (IV)$$

The integral in Equation IV belongs to the type of the so-called elliptical integrals which are to be treated by a series expansion. The result of the series expansion to be made in known manner for $\varphi$ will be, when carried out to the 4th power of K and to the 2nd power of $\alpha$ $$(2+\alpha+K \cos \varphi - \sqrt{1-K^2 \sin^2 \varphi})^{-1} =$$
$$= 1 - \alpha + \alpha^2 + K^2(1/4 - \alpha) + 15/64 K^4 - K(1 - 2\alpha$$
$$+ 1/2 K^2) \cos \varphi + K^2(3/4 - 2\alpha + 7/16 K^2) \cos 2\varphi$$
$$- 1/2 K^3 \cos 3\varphi + 21/64 K^4 \cos 4\varphi \pm \ldots \qquad (V)$$

As a subsequent result, which will be substantiated later, it is presumed that $\alpha$ in the first approximation is equal to $1/2 K^2$. Therefore, the development of the exponential series takes place up to the second power of $\alpha$, but is only discontinued at the 4th power of K. When considering this result, one obtains after insertion of the Equation V into IV and a subsequent integration and subtraction of $\varphi$ from both sides the following:

$$\psi - \varphi = -[\alpha - \alpha^2 - K^2(1/2 - 7/4 \alpha) - 15/32 K^4]\varphi - K(2 - 3\alpha$$
$$+ K^2) \sin \varphi + K^2(3/4 - 13/8 \alpha + 7/16 K^2) \sin 2\varphi$$
$$- 1/3 K^3 \sin 3\varphi + 21/128 K^4 \sin 4\varphi \qquad (VI)$$

Assuming that a complete rotation in $\varphi$ corresponds also to a complete rotation in $\psi$, then the difference $\psi - \varphi$ must have a pure periodic course, i.e. on the right hand side of the Equation VI only periodic terms appear but no term which is proportionate to $\varphi$. Therefore, the following condition applies:

$$15/32 K^4 + (1/2 - 7/4 \alpha) K^2 + \alpha^2 - \alpha = 0 \qquad (VII)$$

If the series expansion (V) were interrupted at lower powers of K and $\alpha$, the condition (VII) would shrink to $$1/2 K^2 - \alpha = 0$$

Herewith is shown that $\alpha$ in its first approximation is equal to $1/2 K^2$.

In the celestial mechanics a relation known as equation of center between the mean angular movement $\psi$ of the planet (called mean anomaly) and its true movement $\varphi$ with respect to the focal point (called true anomaly) is substantiated which is expressed as follows (see for instance J. Bauschinger "Bahnbestimmung der Himmelskörper," 2nd ed., 1928, page 140):

$$\varphi - \psi = \left(2\epsilon - \frac{\epsilon^3}{4}\right) \sin \psi + \frac{5}{4}\epsilon^2 \sin 2\psi + \frac{13}{12}\epsilon^3 \sin 3\psi + \cdots$$

The inversion of this relation is as follows:

$$\psi - \varphi = -2\epsilon \sin \varphi$$
$$+ 5/4 \epsilon^2 \sin 2\varphi - 1/3 \epsilon^3 \sin 3\varphi \pm \qquad (VIII)$$

In order to attain that the gear mechanism of the invention, whose law of movement is defined by the Equation VI in connection with the Equation VII, fulfills as closely as possible the theoretical path as given by the Equation VIII, it would be necessary to establish an agreement of the coefficients of the respective periodic terms. Since now only two parameters K and $\alpha$ can be used for this purpose between which, however, the additional relation as set forth in Equation VII exists, the agreement can only be attained completely with one coefficient. Preferably, the coefficient of the numerically largest term is selected, namely the term with sin $\varphi$. Upon comparison of (VI) and (VIII) one obtains the second condition $$K(2 - 3\alpha + K^2) = 2\epsilon$$

or converted $$\alpha = \frac{2}{3}\left(1 - \frac{\epsilon}{K}\right) + \frac{1}{3}K^2 \qquad (IX)$$

When this value of $\alpha$ is inserted in Equation VII, one obtains the desired relation between K and $\epsilon$, namely the equation of the sixth power $$K^6 + 160K^4 - 208\epsilon K^3 + 64K^2 + 64K\epsilon - 128\epsilon^2 = 0$$

which is identical with the Equation 3. After the determination of K one obtains $\alpha$ from the Equation IX which is in agreement with the condition expressed in claim 4.

The residual errors of the gear mechanism which are produced in view of the not absolutely complete agreement of the higher coefficients, such as the one of sin $2\varphi$, sin $3\varphi$, etc., are illustrated in FIG. 1 by the characteristic III.

Of the solutions of this Equation 3 the one has to be selected which most closely approximates the value of the eccentricity of the orbit under consideration. With the value of K thus computed, $\alpha$ may be obtained from the following equation:

$$\alpha = \frac{2}{3}\left(1 - \frac{\epsilon}{K}\right) + \frac{1}{3}K^2 \qquad (4)$$

When the above values of K and $\alpha$ are employed, the law of motion computed on the basis of the theory of non-circular rolling bodies, concerning the relation between the angle of rotation $\psi$ of the driving gear wheel and the angle of rotation $\varphi$ of the driven gear wheel, deviates only to a very small extent from the exact orbit. By way of example, in the case of the planet Mercury and $\epsilon$ equaling 0.2056, K will be 0.20775 and $\alpha$ will be 0.021299.

If these two figures are introduced into the equation governing the relation of the angle of rotation $\psi$ of the driving gear and the angle of rotation $\varphi$ of the driven gear, we have $$\psi - \varphi = 0.41120 \cdot \sin \varphi + 0.031692 \cdot \sin 2\varphi$$
$$- 0.002989 \cdot \sin 3\varphi \qquad (5)$$

The error in this gear mechanism as compared with the exact orbit is plotted in characteristic III of FIG. 1. It will be noted that the gear mechanism according to the invention results in an excellent approximation of the exact orbit. The greatest residual error is not more than 0.01°.

The gear mechanism according to the invention will be explained in more detail in connection with the FIGS. 2 to 4 of the accompanying drawing.

In the drawing:

FIG. 3 is a top view of a detailed embodiment of the invention, and

FIG. 4 is an elevational view of the embodiment shown in FIG. 3.

Figure 1:
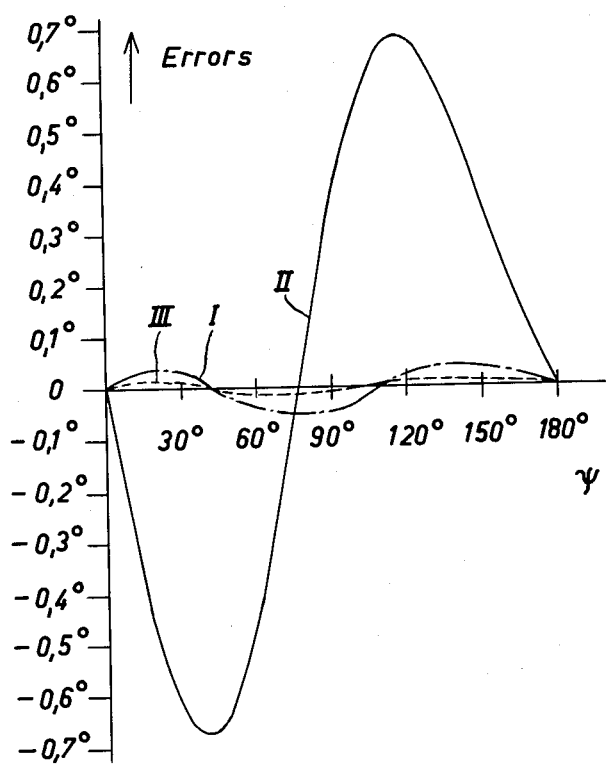
FIG. 1 shows a comparison of characteristics of residual errors in the orbit encountered in prior art systems with the gear mechanism according to the invention.
Figure 2:
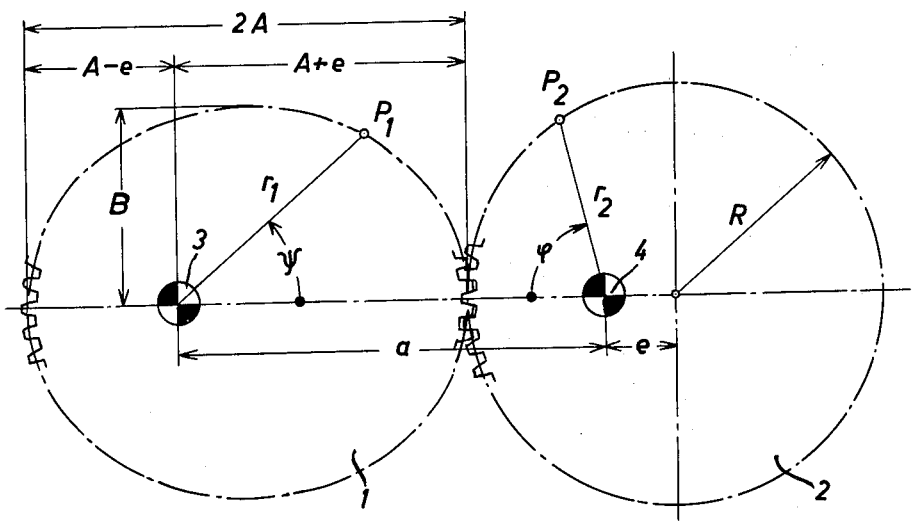
FIG. 2 is a diagrammatic representation of the gear mechanism according to the invention (top view)

In FIG. 2, reference numeral 1 designates a non-circular driving gear wheel, and reference numeral 2 designates a circular driven gear wheel. The radius of the circular gear wheel 2 is R, while the larger diameter of the driving gear wheel 1 is 2A and the small diameter thereof is 2B.

The axis of rotation 3 of the driving gear wheel 1 and the axis of rotation 4 of the driven circular gear wheel 2 are eccentrically journaled for the same amount $e$. The mutual distance of the axes 3 and 4 is $a$.

The polar angle $\psi$ and the radius vector $r_1$ of the pitch curve of the driving gear wheel theoretically have to comply with the integral formula $$\psi = \int_{r_1}^{a+e-R} \frac{R^2 - e^2 + (a-r_1)^2}{\sqrt{4e^2(a-r_1)^2 - [R^2 - e^2 - (a-r_1)^2]^2}} \cdot \frac{dr_1}{r_1} \quad (6)$$

but the driving gear may also be represented with an excellent approximation by a non-circular gear having two symmetrical semi-axes A and B.

The development of this Equation 6 is as follows:

From the basic equation for non-circular gears as shown in the previously mentioned work by J. J. Pesqueira, page 454, equation (6), one obtains for the present case $$r_1 d\psi = r_2 d\varphi$$

$$d\psi = \frac{r_2}{r_1} d\varphi \quad (X)$$

Equation IIa furnishes $$\cos \varphi = \frac{R^2 - e^2 - r_2^2}{2er_2} \quad (XI)$$

and by differentiation one obtains $$-\sin \varphi \, d\varphi = -\frac{R^2 - e^2 + r_2^2}{2er_2^2} dr_2$$

Expressing $\sin \varphi$ by means of Equation XI by $\cos \varphi$, one obtains $$d\varphi = \frac{R^2 - e^2 + r_2^2}{2er_2^2 \sqrt{1 - \frac{(R^2 - e^2 - r_2^2)^2}{4e^2 r_2^2}}} dr_2$$

$$= \frac{R^2 - e^2 + r_2^2}{r_2 \sqrt{4e^2 r_2^2 - (R^2 - e^2 - r_2^2)^2}} dr_2$$

In the latter value is inserted in Equation X and if one considers that $$r_2 = a - r_1$$

and $$dr_2 = -dr_1$$

then $$d\psi = -\frac{R^2 - e^2 + (a - r_1)^2}{r_1 \sqrt{4e^2(a-r_1)^2 - [R^2 - e^2 - (a-r_1)^2]^2}} dr_1$$

Upon integration the zero point of $\psi$ is positioned at the point where the radial vector $r_1$ has its maximum value (see FIG. 2), namely $$r_{1max} = a + e - R$$

Accordingly, $$\psi = \int_{r_1}^{a+e-R} \frac{R^2 - e^2 + (a-r_1)^2}{\sqrt{4e^2(a-r_1)^2 - [R^2 - e^2 - (a-r_1)^2]^2}} \cdot \frac{dr_1}{r_1} \quad (XII)$$

This equation is the same as Equation 6. The integral in this equation is again of the type of elliptical integrals.

FIG. 2 illustrates the relation for the large diameter of the driving gear wheel 1

$$2A = a - (R+e) + a - (R-e) = 2(a-R)$$

With the aid of the relation of the Formula 2 one has $$2A = 2R(1+\alpha) \quad (7)$$

Since according to Formula 4 $\alpha$ is a function of K and $\epsilon$, and according to Formula 3 K is a function of the eccentricity $\epsilon$ of the orbit, it follows that $\alpha$ is merely a function of the eccentricity of the orbit and therefore a constant for a predetermined orbit eccentricity.

A similar relation exists for the small diameter of the driving gear wheel and the end result is as follows:

$$2B = 2R(1-\beta) \quad (8)$$

In this equation R is again the radius of the circular gear wheel 2, and $\beta$ is a constant which may be calculated from the respective eccentricity $\epsilon$ of the orbit to be represented. The value of the eccentricity $e$ of the axes of rotation 3 and 4 is determined by the Formula 1 as follows:

$$e = K \cdot R \quad (9)$$

R signifies again the radius of the circular gear wheel 2 and K, as already noted, is a constant which may be calculated with the aid of the respective eccentricity $\epsilon$ of the orbit to be represented, for instance according to the Formula 3.

The table in FIG. 2 shows the data of two gear mechanisms according to the invention and which represent substantial eccentric orbits.

It follows that in a gear mechanism according to the invention for representing the orbit of the planet Mercury, for instance, the large diameter 2A of the driving gear wheel 1 will be 2.130% larger and the small diameter 2B of the driving gear wheel 1 will be 2.155% smaller than the diameter 2R of the driven circular gear wheel 2. In the case of most of the other planets (with the exception of the planet Pluto) the deviations from the true circular form are still less than the ones indicated.

The manufacture of the driven circular gear wheel 2 causes no difficulties and is carried out in well known manner. The module $m$, the number of teeth $z$ and the radius R of the pitch circle of the circular gear are related by the well known relation $m \cdot z = 2R$.

The driving non-circular gear wheel 1 is also easily manufactured according to the invention by first producing a ring gear wheel having a diameter equal to the diameter 2R of the driven gear wheel 2 and then elastically deforming this ring gear wheel in such a manner that one diameter will be enlarged by the required value $2R \cdot \alpha$, while the other diameter which is perpendicular to the first one will be decreased by the value $2R \cdot \beta$. Since the required deformations are comparatively small, the elastic limit of the material will not be exceeded, provided the selected thickness is sufficiently small. The configuration of the ring gear wheel thus obtained corresponds exactly at the ends of the two main diameters, which are perpendicular to each other, to the theoretically exact configuration of the gear wheel and deviates from the latter at the remaining locations only to such a small extent that the errors do not exceed the usual gear wheel tolerances. The deformed ring gear wheel is subsequently attached to an eccentrically journaled carrier wheel.

FIGS. 3 and 4 show an embodiment of a gear mechanism as hereinbefore described. A plate 5 is eccentrically attached to a drive shaft 3 which revolves at uniform speed. The plate 5 is provided with two threaded bores 6 and 6' positioned on an axis of symmetry of the plate and having therein each an adjustment screw 7 and 7'. These two adjustment screws abut against brackets 8, 8' which are splined to the ring gear 9. By adjusting the adjustment screws 7, 7' the ring gear 9 may be spread in a horizontal direction.

Along the other axis of symmetry of the plate 5 are mounted in rectangular apertures 10, 10' the heads of two adjustment screws 11, 11'. The screws 11, 11' extend outwardly through bores 12, 12' in the plate 5 and threadedly engage brackets 13, 13' which are splined to the ring gear 9. The four pins 14, 15 and 14', 15' associated with the brackets are respectively spaced 90° from each other. The last mentioned adjustment screws 11, 11' are used to exert an inwardly directed tensional force on the ring gear 9, resulting in a contraction perpendicular to the direction of the aforementioned spreading or expansion. Therefore it is possible, by means of the four adjustment screws 7, 7' and 11, 11' to adjust the diameters 2A and 2B of the driving gear wheel 9 exactly to the previously computed values. The driving gear wheel 9 is in mesh with the circular gear wheel 2 which has an equal number of teeth and is journaled about the axis 4. The latter is eccentrically located a predetermined amount $e$. The support 16 which non-uniformly revolves with the gear wheel 2 represents the respective locus of the planet to be projected and receives a control element which aligns the optical axis of the projector with the thus represented locus of the planet.

The illustrated embodiment of the gear mechanism as shown in FIGS. 3 and 4 has the advantage that the required dimensions of the driving gear wheel are progressively adjustable. Such a gear mechanism may be used, if the eccentricity $e$ of the pivotal axes 3 and 4 is also progressively adjustable in slots 17 and 18 of the plate 5 and gear wheel 2, respectively and lockable to represent the orbit of different planets.

It will be appreciated that the driving gear wheel may be made rigid and dimensioned only for the representation of a predetermined orbit. In this instance, the ring gear of the driving gear wheel will be invariably deformed the required amounts, for instance by applying the ring gear to a carrier wheel so dimensioned that the ring gear will be deformed as required in both axial directions. In such a case a specially formed carrier wheel has to be provided for each orbit to be represented.

The ring gear of the driving wheel will be of such a cross-sectional configuration that the neutral zone of the distorted cross-section will coincide with the pitch curve of the gear tooth system.

The invention further includes a method for giving the driving gear the exact configuration corresponding to the Formula 6, said method being particularly suitable for the manufacture of the gear mechanism in greater numbers. To this end an eccentrically journaled cutting pinion is used for producing the driving gear wheel employing a rolling process known as such, whereby the rotary motion of the cutting pinion and that of the driving gear wheel to be produced are non-uniformly controlled with respect to each other, for instance, with the aid of a driving gear wheel produced in single manufacture and complying exactly with the Formula 6 in accordance with the laws of motion of the planet to be represented.

What I claim is:

1. A gear mechanism for representing a planetary motion in a planetarium apparatus, in a sun system projector, or the like, said gear mechanism comprising a pair of meshing gear wheels which are non-circular with respect to their respective axes of rotation, said axes being fixedly spaced from each other, one of said gear wheels being driven by the other and comprising an eccentrically journaled circular gear wheel, said one gear wheel which forms the driving gear wheel and said driven circular gear wheel are eccentrically journaled by the same amount $e = K \cdot R$, whereby R is the radius of the driven circular gear wheel and K is a constant obtainable from the eccentricity $\epsilon$ of the planetary orbit to be represented, and satisfying the relation $$K^6 + 160K^4 - 208\epsilon K^3 + 64K^2 + 64K\epsilon - 128\epsilon^2 = 0$$

2. A gear mechanism according to claim 1, in which the polar angle $\psi$ and the radius vector $r_1$ of the driving gear satisfy the formula $$\psi = \int_{r_1}^{a+e-R} \frac{R^2 - e^2 + (a-r_1)^2}{\sqrt{4e^2(a-r_1)^2 - [R^2 - e^2 - (a-r_1)^2]^2}} \cdot \frac{dr_1}{r_1}$$

in which formula

R is the radius of the driven circular gear wheel, $a$ is the distance between the axes of rotation of said two gear wheels, and $e$ is the distance of the center of the pitch circle of the circular driven gear from its axis of rotation which is similar to the distance from the intersection of the major and minor axes of the non-circular driving gear to its axis of rotation.

3. A method for producing the driving gear wheel of the gear mechanism according to claim 2, which includes the steps of producing the driving gear with the aid of an eccentrically journaled cutting pinion, whereby the mutual rotary motions of the cutting pinion and the driving gear to be manufactured are non-uniformly controlled according to the planetary motion to be represented.

4. A gear mechanism according to claim 1, in which the large diameter 2A of the non-circular gear wheel is equal to $2R(1+\alpha)$, and in which the small diameter 2B is equal to $2R(1-\beta)$, whereby R is the radius of the driven circular gear wheel and $\alpha$ and $\beta$ are constants obtainable from the eccentricity $\epsilon$ of the planetary orbit to be represented.

5. A gear mechanism according to claim 1, in which the large diameter 2A of the non-circular gear wheel is equal to $2R(1+\alpha)$, and in which the small diameter 2B is equal to $2R(1-\beta)$, whereby R is the radius of the driven circular gear wheel and $\alpha$ and $\beta$ are constants obtainable from the eccentricity $\epsilon$ of the planetary orbit to be represented, said driving gear wheel comprising a ring gear of initially circular configuration which is deformed to a predetermined extent in two directions corresponding to two mutually perpendicular diameters, said ring gear being initially of the diameter of the driven circular gear wheel.

6. A gear mechanism according to claim 5, in which the cross-sectional configuration of the ring gear is such that the neutral zone thereof coincides with the pitch curve of the gear tooth system.

7. A gear mechanism according to claim 1, in which the large diameter 2A of the non-circular gear wheel is equal to $2R(1+\alpha)$, and in which the small diameter 2B is equal to $2R(1-\beta)$, whereby R is the radius of the driven circular gear wheel and $\alpha$ and $\beta$ are constants obtainable from the eccentricity $\epsilon$ of the planetary orbit to be represented, said driving gear wheel comprising a ring gear of initially circular configuration which is deformed to a predetermined extent in two directions corresponding to two mutually perpendicular diameters, said ring gear being initially of the diameter of the driven circular gear wheel, the deformation of said driving gear wheel being progressively variable.

8. A gear mechanism according to claim 1, in which the large diameter 2A of the non-circular gear wheel is equal to $2R(1+\alpha)$, and in which the small diameter 2B is equal to $2R(1-\beta)$, whereby R is the radius of the driven circular gear wheel and $\alpha$ and $\beta$ are constants obtainable from the eccentricity $\epsilon$ of the planetary orbit to be represented, said driving gear wheel comprising a ring gear of initially circular configuration which is deformed to a predetermined extent in two directions corresponding to two mutually perpendicular diameters, said ring gear being initially of the diameter of the driven circular gear wheel, the deformation of said driving gear wheel being progressively variable, and an eccentrically journaled plate to which said ring gear is attached by means of two pairs of adjustment screws, said adjustment screws being mounted in such a way that one pair of said screws serves to expand said ring gear in one direction, while the other pair of said adjustment screws serves to contract said ring gear in a direction perpendicular to the direction of the aforementioned expansion.

9. A gear mechanism for representing a planetary motion in a planetarium apparatus, in a sun system projector, or the like, said gear mechanism comprising a pair of meshing gear wheels which are non-circular with respect to their respective axes of rotation, said axes being fixedly spaced from each other, one of said gear wheels being driven by the other and comprising an eccentrically journaled circular gear wheel, bearings for both said gear wheels, means for progressively adjusting said bearings for changing the eccentricity of said gear wheels, and means for locking said bearings in the adjusted positions.

References Cited in the file of this patent
UNITED STATES PATENTS

| | | |
|---|---|---|
| 1,507,908 | Crawford | Sept. 9, 1924 |
| 2,788,567 | Stibitz | Apr. 16, 1957 |

OTHER REFERENCES

Pesqueira, J. J.: "Principles of Design for Non-Circular Gears," Product Engineering, pages 454–457, December 1936; pages 19–22, January 1937; pages 63–65, February 1937 (three-part series).

Bloomfield, B.: "When You Need Non-Circular Gears," Product Engineering, pages 59–66, Mar. 14, 1960.